Patented Sept. 13, 1938

2,129,836

UNITED STATES PATENT OFFICE 2,129,836

COSMETIC CREAM BASE

Herman Goodman, New York, N. Y., assignor to Cosmetic Research, Inc., New York, N. Y., a corporation of New York No Drawing. Application July 2, 1936, Serial No. 88,596

3 Claims. (Cl. 167—91)

This invention relates to the art of cosmetic creams, lotions and the like.

Cold cream, vanishing cream, shaving cream and similar products are semi-solid or pasty water emulsions containing from 40 to 80% of water. Lotions and more liquid aqueous emulsions frequently contain more water. The prices of these preparations are out of all proportion to the cost of the ingredients and the labor expended in making them. It has been suggested that a large proportion of this cost could be eliminated if these products could be prepared at home, and various recipes have been given for this which require the user to purchase the various substances at the corner drug store and make up the product from these raw materials. This home manufacture, however, has not been popular due probably largely to unfamiliarity with carrying out chemical processes of this kind and fear that the resultant product might be harmful to the user. Another reason for the high cost of these preparations is due also in part to difficulties in shipping them. They are often subjected to high temperatures and under these conditions tend to separate out into products which no longer have the appearance of the original product and which are refused by the customers. For example, long storage near steam pipes in warehouses or ships' holds may raise the temperature sufficiently to cause this deterioration with consequent loss.

The principal object of the present invention, accordingly, is to prepare a simple inexpensive composition which may be easily transformed into cold cream, vanishing cream, shaving cream and similar preparations in the home or elsewhere, and which shall overcome the difficulties mentioned which occur in transportation and storage.

I have found in accordance with my invention that simple bases may be prepared to which water may be added with heat to prepare the various creams and other preparations of this type. These bases are water-free or substantially water-free concentrates of various compositions containing emulsifiers which form the emulsions upon the addition of water at the proper temperature. The amount of water added and the temperature depend upon the ingredients employed and the finished emulsion may be used in any field, such as in the cosmetic creams mentioned. These bases, generally speaking, are made up of saponifiable and non-saponifiable oils and waxes. I have found it possible in the preparation of these cosmetic materials to combine the oils and waxes, together with an emulsifying or saponifiable agent, into a substantially solid form. The products usually have about the consistency of cocoa butter at ordinary temperatures. They can be shipped and handled in containers which do not require to be moisture-tight as did the jars, tubes, and other containers employed for cosmetic preparations of this type heretofore. I have found in accordance with this invention that it is ordinarily important not to use the caustic alkalies as saponifying or emulsifying agents for the fats and/or waxes employed in compositions. In the compositions given below I use as a saponifying and emulsifying agent the material known as triethanolamine. This is an alkaline substance. It has a saponifying or emulsifying action on the saponifiable ingredients of the mixtures and the products obtained by its use are soft and unctuous. The base material is smooth. I have found that if strong alkali such as caustic soda or caustic potash or even if borax or ammonia are incorporated in a base of this type that the base has a harsh and sandy feel and that when water is later added to it it becomes granular and accordingly unsatisfactory. With triethanolamine or similar material these properties in the base and in the product to which the water has been added do not appear.

The base is ordinarily prepared by melting together the various ingredients given below and then after hardening is ready to be packaged and shipped. When it reaches the consumer, all that is necessary to do is to combine it with water under proper heat conditions to produce the desired product. Ordinarily this combination with water may be made by dropping the required amount of the material into hot water, or cold water may be added to the heated base, or both base and water may be heated. During the mixing of the base with water it is preferable to continually stir the mass.

I give below examples of compositions representing various embodiments of my invention made in the manner in which I now prefer to manufacture them. It is to be understood, however, that these examples are purely illustrative and I do not desire to be restricted thereto. The following are the compositions mentioned:

Example 1

Cold cream:
| | | |
|---|---|---|
| Stearic acid | gm. | 30 |
| Liquid petrolatum | cc. | 30 |
| Oil sweet almonds | cc. | 30 |
| Triethanolamine | cc. | 8 |

Example 2

Cold cream:
| | | |
|---|---|---|
| Beeswax | gm. | 14 |
| Stearic acid | gm. | 4 |
| Lanolin | gm. | 10 |
| Liquid petrolatum | cc. | 16 |
| Glycerin | cc. | 6 |
| Triethanolamine | cc. | 1 |

*Example 3*

Cleansing cream:
- Ceresin_____gm___ 8
- Stearic acid_____gm___ 6
- Petrolatum_____gm___ 30
- Liquid petrolatum_____cc____ 40
- Triethanolamine_____cc____ 4

*Example 4*

Cleansing cream:
- Stearic acid_____gm___ 16
- Liquid petrolatum_____cc____ 24
- Lanolin_____gm___ 4
- Triethanolamine_____cc____ 6

*Example 5*

Hand cream:
- Stearic acid_____gm___ 10
- Beeswax_____gm___ 4
- Petrolatum_____gm___ 10
- Liquid petrolatum_____cc____ 6
- Triethanolamine_____cc____ 2

*Example 6*

Medicated cream:
- Stearic acid_____gm___ 15
- Lanolin anhydrous_____gm___ 15
- Triethanolamine_____cc____ 2
- Zinc oxide_____gm___ 10

*Example 7*

Vanishing cream:
- Stearic acid_____gm___ 24
- Lanolin_____gm___ 4
- Carbitol_____cc____ 9
- Triethanolamine_____cc____ 1

(Carbitol is diethylene glycol ethyl ether.)

*Example 8*

Liquid cleansing cream:
- Stearic acid_____gm___ 16
- Liquid petrolatum_____cc____ 40
- Triethanolamine_____cc____ 6

*Example 9*

Shampoo milk:
- Stearic acid_____gm___ 6
- Liquid petrolatum_____cc____ 32
- Triethanolamine_____cc____ 2

*Example 10*

Shaving cream:
- Stearic acid_____gm___ 16
- Lanolin_____gm___ 4
- Triethanolamine_____cc____ 1

*Example 11*

All purpose cream:
- Stearic acid_____gm___ 12
- Lanolin_____gm___ 6
- Hydrogenated cottonseed oil_____gm___ 6
- Triethanolamine_____cc____ 2

*Example 12*

Medicated cream:
- Stearic acid_____gm___ 15
- Lanolin_____gm___ 15
- Cottonseed oil_____cc____ 15
- Triethanolamine_____cc____ 2
- Zinc oxide_____gm___ 10

*Example 13*

Skin oil:
- Lanolin_____gm___ 15
- Liquid petrolatum_____cc____ 45
- Triethanolamine_____cc____ 2

Each of the above compositions is prepared by bringing together the ingredients in substantially anhydrous form mentioned and heating up until the mass assumes the form of a fluid. This fluid is then allowed to cool and constitutes the base for the manufacture of the particular product indicated in the example selected. This base may be shipped in bulk or molded in the form of small cakes or otherwise as desired. The material is then shipped out and is purchased by the consumer. It is then combined with a suitable quantity of water. All that is necessary for the purchaser of a cake to do is to melt the cake, and add hot or cold water to it in suitable proportions. The proportions of water which I prefer in the final product and the temperatures at which the combination of water and the base is made are as follows:—

| Cosmetic material | Water percent in final product | Heat °C. |
|---|---|---|
| Ex. 1. Cold cream | 33–50 | 48–60 |
| Ex. 2. Cold cream | 50–60 | 54–60 |
| Ex. 3. Cleansing cream | 33–66 | 54–60 |
| Ex. 4. Cleansing cream | 50–75 | 48–60 |
| Ex. 5. Hand cream | 50–66 | 54–60 |
| Ex. 6. Medicated cream | 50–66 | 48–60 |
| Ex. 7. Vanishing cream | 50–75 | 48–60 |
| Ex. 8. Liquid cleansing cream | 75–80 | 54–60 |
| Ex. 9. Shampoo milk | 80–90 | 48–60 |
| Ex. 10. Shaving cream | 60–80 | 48–60 |
| Ex. 11. All purpose cream | 33–50 | 48–60 |
| Ex. 12. Medicated cream | 50–75 | 48–60 |
| Ex. 13. Skin oil | 66–75 | 48–60 |

The bases as above prepared are easy to ship and substantially not injured by the usual climatic changes. They are ready for use by the purchaser. All that is necessary to do is to add water and heat in order to produce the various cosmetic preparations desired. Perfume, preservative, or other substance may be added to the base, if desired, or may be incorporated at the time of manufacturing the aqueous product. The base may be inexpensively produced and with consequent saving to the consumer. The bases as above prepared contain appreciable amounts of unreacted fatty acid since each formula contains an excess of fatty acid over the stoichiometric amount required to react with the ethanolamine.

The term "fatty substance" as used in the claims is intended to cover various greasy substances which are insoluble in water and soluble in the usual organic solvents and including stearic acid, lanolin, beeswax, ceresin, cetyl alcohol, cocoa butter and carnauba wax. The term "oily substance" as herein employed is intended to designate combustible liquids immiscible with water insoluble in ether, and including liquid petrolatum, oil of sweet almonds, Carbitol, sulphonated olive and castor oil, turpentine and cottonseed oil.

Triethanolamine usually is found commercially as a mixture of triethanolamine with small amounts of monoethanolamine and di-ethanolamine. The expression "triethanolamine" as herein employed is intended to include this commercial product. Instead of the triethanolamine I may employ as emulsifying agents other organic emulsifiers, such as monoethanolamine and di-ethanolamine.

While the invention has been described in detail according to the preferred manner of carrying out the process, it will be obvious to those skilled in the art after understanding the invention, that changes and modifications may be made therein without departing from the spirit or scope of the invention, and it is intended in the appended claims to cover all such changes and modifications.

What is claimed as new and desired to be secured by Letters Patent, is:—

1. A cosmetic composition consisting of the reaction product of stearic acid and triethanolamine, mixed with petrolatum in proportions to produce a solid cake which is solid at and above ordinary temperatures, and is substantially anhydrous, and which is adapted to be blended with water to produce a smooth cosmetic cream.

2. A cosmetic composition consisting of the reaction product of a fatty acid and an ethanolamine, mixed with an unsaponifiable oily material, in proportions to produce a solid cake which is solid at and above ordinary temperatures, and is substantially anhydrous, and which is adapted to be blended with water to produce a smooth cosmetic cream.

3. A process for making a cosmetic composition, which comprises mixing the reaction product of a fatty acid and an ethanolamine with an unsaponifiable oily material under substantially anhydrous conditions, and in proportions to produce a solid cake, which cake is adapted to be combined with ½ to 2 parts of water to one part of said cake to produce a smooth cosmetic cream.

HERMAN GOODMAN.